United States Patent
Hoshino et al.

(10) Patent No.: US 8,873,203 B2
(45) Date of Patent: Oct. 28, 2014

(54) MAGNETIC HEAD HAVING A SOFT MAGNETIC LAYER FORMED BEHIND A TUNNELING MAGNETORESISTANCE (TMR) SENSOR IN AN ELEMENT HEIGHT DIRECTION

(71) Applicant: HGST Netherlands B.V., Amsterdam (NL)

(72) Inventors: Katsumi Hoshino, Odawara (JP); Kouji Kataoka, Odawara (JP); Takashi Wagatsuma, Odawara (JP); Yukimasa Okada, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/724,529

(22) Filed: Dec. 21, 2012

(65) Prior Publication Data

US 2014/0177093 A1  Jun. 26, 2014

(51) Int. Cl.
  *G11B 5/39* (2006.01)
  *G11B 19/20* (2006.01)
  *G11B 5/10* (2006.01)
  *G11B 5/11* (2006.01)

(52) U.S. Cl.
  CPC  *G11B 5/11* (2013.01); *G11B 19/20* (2013.01); *G11B 5/102* (2013.01)
  USPC ............ 360/319; 360/320; 360/324.12

(58) Field of Classification Search
  USPC ......... 360/324.1, 324.11, 324.12, 324.2, 319, 360/320, 322
  See application file for complete search history.

(56) References Cited

U.S. PATENT DOCUMENTS

| | | | |
|---|---|---|---|
| 5,132,859 A | 7/1992 | Andricacos et al. | |
| 6,005,753 A * | 12/1999 | Fontana et al. | 360/324.2 |
| 6,223,420 B1 | 5/2001 | Lee et al. | |
| 6,636,391 B2 | 10/2003 | Watanabe et al. | |
| 6,807,032 B1 | 10/2004 | Seigler et al. | |
| 6,903,906 B2 | 6/2005 | Morinaga et al. | |
| 6,943,993 B2 | 9/2005 | Chang et al. | |
| 7,035,062 B1 * | 4/2006 | Mao et al. | 360/324.2 |
| 7,333,304 B2 | 2/2008 | Gill et al. | |
| 7,440,240 B2 | 10/2008 | Hoshiya et al. | |
| 7,505,232 B2 | 3/2009 | Haginoya et al. | |
| 7,533,456 B2 | 5/2009 | Tsuchiya et al. | |
| 7,768,749 B2 | 8/2010 | Beach et al. | |
| 7,830,641 B2 | 11/2010 | Lin | |
| 7,843,668 B2 * | 11/2010 | Machita et al. | 360/319 |
| 8,077,435 B1 | 12/2011 | Liu et al. | |
| 8,085,512 B2 * | 12/2011 | Mizuno et al. | 360/324.12 |
| 8,400,738 B2 * | 3/2013 | Covington et al. | 360/324.12 |
| 2002/0114111 A1 * | 8/2002 | Zhu | 360/324.1 |
| 2011/0102949 A1 | 5/2011 | Yuan et al. | |
| 2013/0128390 A1 * | 5/2013 | Qiu et al. | 360/324.11 |

* cited by examiner

*Primary Examiner* — Jefferson Evans
(74) *Attorney, Agent, or Firm* — Zilka-Kotab, PC

(57) ABSTRACT

A magnetic head according to one embodiment includes a read sensor adapted for sensing an external magnetic field; an upper magnetic shield positioned above the read sensor along an air bearing surface (ABS) of the read sensor; a lower magnetic shield positioned below the read sensor along the ABS of the read sensor; a rear insulating layer positioned on a rear side of the read sensor, the rear side being on an opposite side of the read sensor as the ABS of the read sensor; and a soft magnetic layer positioned near the rear side of the read sensor opposite the ABS of the read sensor, wherein the rear insulating layer is positioned between the soft magnetic layer and the read sensor, and wherein the rear insulating layer is positioned between the soft magnetic layer and the lower magnetic shield.

20 Claims, 13 Drawing Sheets

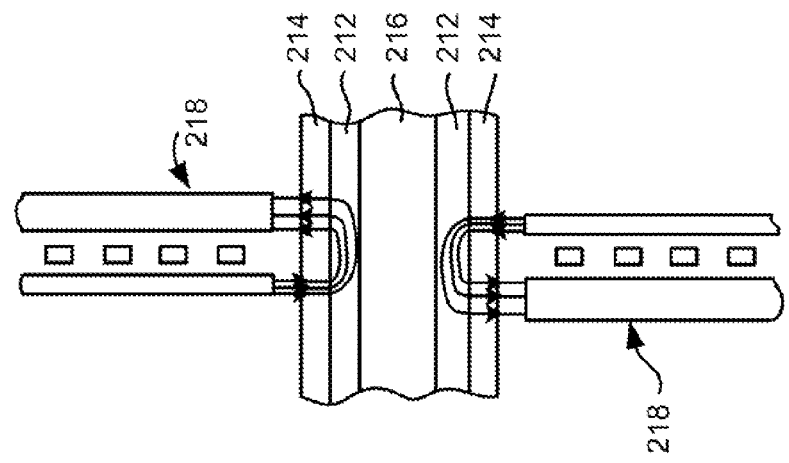
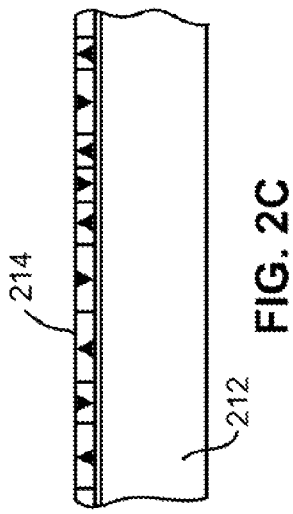
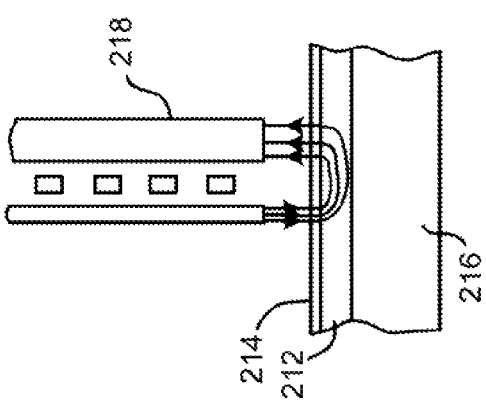
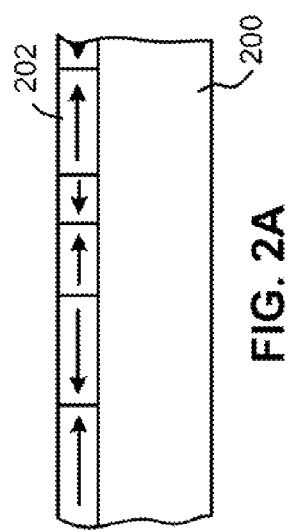
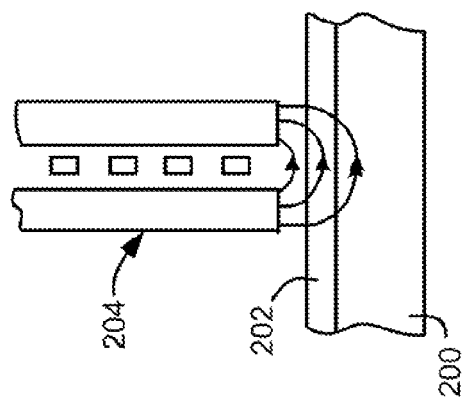

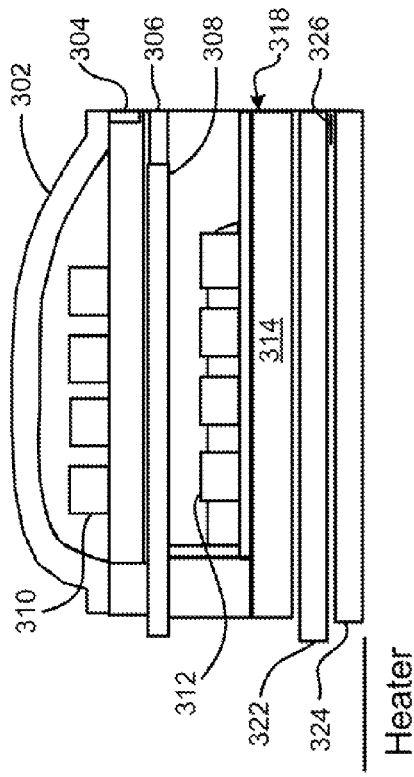
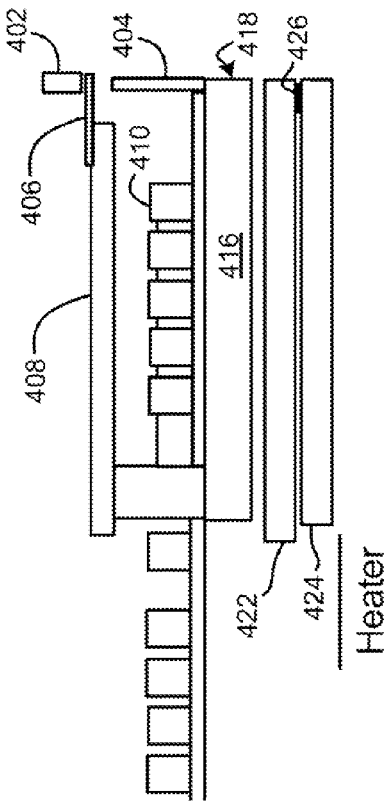
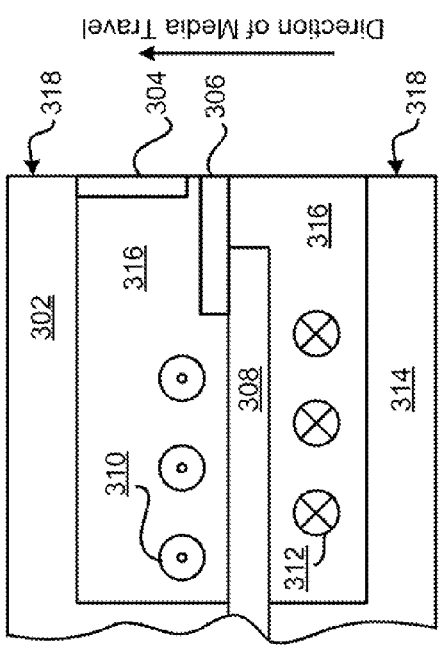
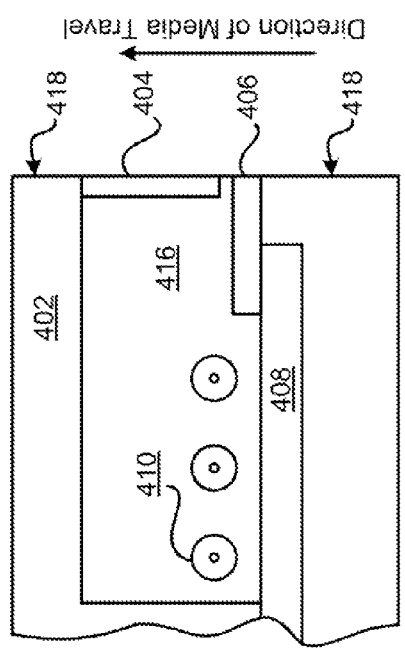
FIG. 3A  FIG. 4A
FIG. 3B  FIG. 4B

MAGNETIC HEAD HAVING A SOFT MAGNETIC LAYER FORMED BEHIND A TUNNELING MAGNETORESISTANCE (TMR) SENSOR IN AN ELEMENT HEIGHT DIRECTION

FIELD OF THE INVENTION

The present invention relates to data storage systems, and more particularly, this invention relates to a magnetic head having a soft magnetic layer positioned behind the sensor in an element height direction.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. As higher recording densities have been adopted for magnetic recording, tunneling magnetoresistance (TMR) films have come to be used in read sensors of HDDs, which has resulted in improved sensor performance (such as output, signal-to-noise ratio (SNR), etc.). Furthermore, improvements in the film structure have been achieved which has further improved sensor performance. The TMR film structure typically includes an antiferromagnetic layer/ferromagnetic layer/nonmagnetic insulating layer/magnetization free layer. The magnetization of the ferromagnetic layer is fixed by the exchange coupling magnetic field generated at the interface of the ferromagnetic layer and the antiferromagnetic layer. Also, the relative direction of magnetization of the magnetization layer comprising the magnetization free layer is changed due to inversion of the magnetization of the external magnetic field. In addition, the magnetic field is detected by the change in electrical resistance produced when current flows perpendicular to the surface of the TMR film.

If the sensor size is simply made smaller to accommodate the higher recording densities, the sensor output drops and noise increasingly occurs, making it difficult to read the signal recorded on the magnetic recording medium. Accordingly, further improvements in sensor structure design that allow for improved sensor output would be greatly beneficial.

SUMMARY

A magnetic head according to one embodiment includes a read sensor adapted for sensing an external magnetic field; an upper magnetic shield positioned above the read sensor along an air bearing surface (ABS) of the read sensor; a lower magnetic shield positioned below the read sensor along the ABS of the read sensor; a rear insulating layer positioned on a rear side of the read sensor, the rear side being on an opposite side of the read sensor as the ABS of the read sensor; and a soft magnetic layer positioned near the rear side of the read sensor opposite the ABS of the read sensor, wherein the rear insulating layer is positioned between the soft magnetic layer and the read sensor, and wherein the rear insulating layer is positioned between the soft magnetic layer and the lower magnetic shield.

A method for forming a magnetic head according to one embodiment includes forming a lower magnetic shield above a substrate; forming a sensor stack above the lower magnetic shield, wherein the sensor stack is adapted for sensing an external magnetic field; forming a rear insulating layer on a rear side of the sensor stack, the rear side being on an opposite side of the sensor stack as an air bearing surface (ABS) side of the sensor stack; forming a soft magnetic layer above the rear insulating layer near the rear side of the sensor stack; planarizing the soft magnetic layer; and forming an upper magnetic shield above the sensor stack and the soft magnetic layer; wherein the rear insulating layer is positioned between the soft magnetic layer and the sensor stack, and wherein the rear insulating layer is positioned between the soft magnetic layer and the lower magnetic shield.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
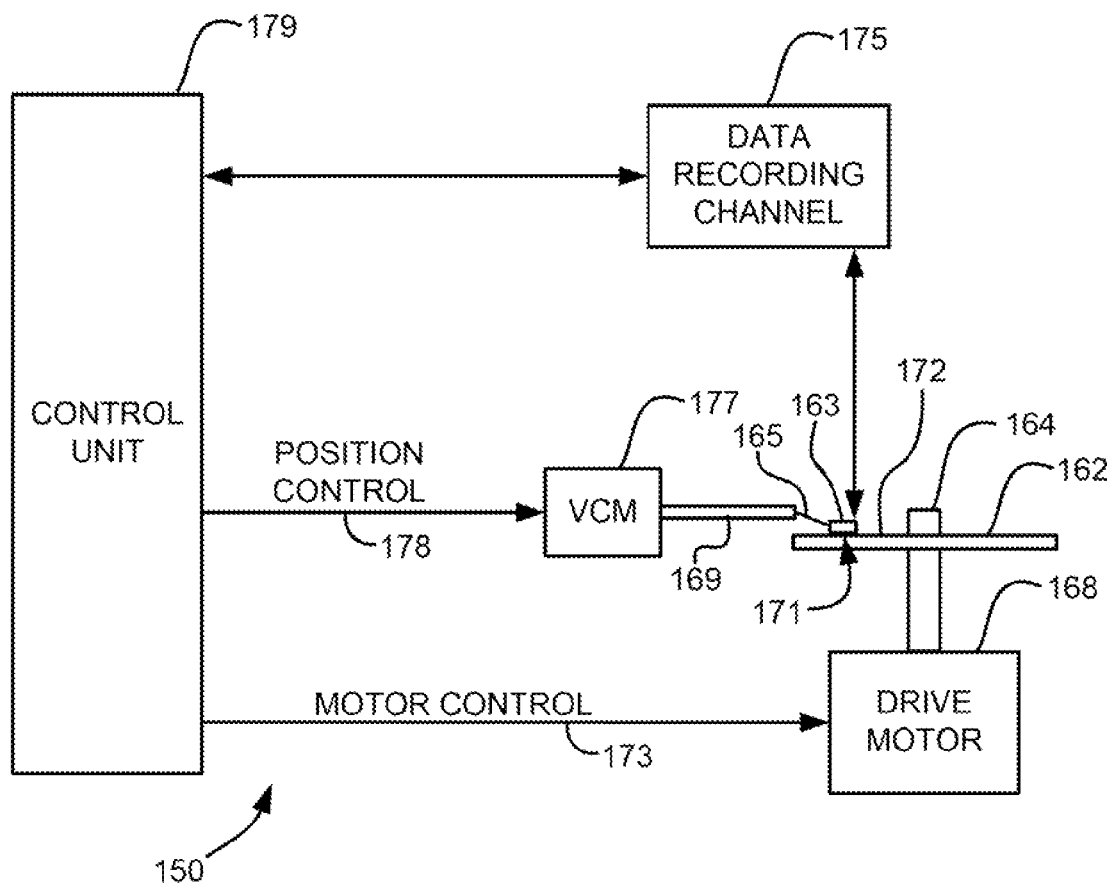
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one approach, a tunneling magnetoresistance (TMR) read head includes a structure wherein a soft magnetic material is positioned on a side opposite to the air bearing surface (ABS) side of the TMR sensor. In a conventional head, change only occurs in the magnetization free layer of the TMR head near the vicinity of the ABS. In contrast, in embodiments described herein, a magnetic field produced by a magnetic medium is applied efficiently to the magnetization free layer due in part to the positioning of a soft magnetic material on the opposite side to that of the ABS, so the entire magnetization free layer is rotated while maintaining stability of the magnetization free layer. As a result, sensor output is increased.

In particular, this results in the element height (which is the length of the head in the height direction away from the head ABS) of the head becoming shorter as the read head size becomes smaller due to increased recording density. Accordingly, when the element height is small, a distance between the medium and the soft magnetic layer positioned on the opposite side to the ABS becomes smaller, which further increases the beneficial effects of this soft magnetic layer.

However, a problem occurs in that if the soft magnetic layer is simply arranged at the rear face of the TMR head, this soft magnetic layer itself tends to assume an unstable magnetic condition and, influenced by this, the magnetization free layer of the TMR head also becomes unstable. In order to suppress this, it is beneficial to perform magnetic domain control of the soft magnetic layer that is positioned at the rear face of the TMR head.

In one embodiment, an antiferromagnetic (AFM) material, or high-coercivity material, is formed directly on the aforementioned soft magnetic layer, or is formed behind the soft magnetic layer on a thin non-magnetic layer. In another embodiment, the soft magnetic layer is laminated and an intermediate, antiparallel coupling (APC) layer comprising a suitable material, such as Ru, Ir, etc., is formed. In this way, a structure is formed in which AFM coupling of a soft magnetic layer that is divided into a plurality of layers is achieved, the magnetization of the upper and lower soft magnetic layers being antiparallel. In this way, reproduction sensitivity is improved by efficient rotation of the entire magnetization free layer of the TMR head, due to the arrangement of a soft magnetic layer on the rear face of the TMR head, on the opposite side from the air bearing surface. This not only increases the read sensor output, but also makes it possible to maintain stability by domain control of the soft magnetic layer at the TMR head's rear face.

In one general embodiment, a magnetic head includes a read sensor adapted for sensing an external magnetic field; an upper magnetic shield positioned above the read sensor along an air bearing surface (ABS) of the read sensor; a lower magnetic shield positioned below the read sensor along the ABS of the read sensor, a rear insulating layer positioned on a rear side of the read sensor, the rear side being on an opposite side of the read sensor as the ABS of the read sensor; and a soft magnetic layer positioned near the rear side of the read sensor opposite the ABS of the read sensor, wherein the rear insulating layer is positioned between the soft magnetic layer and the read sensor, and wherein the rear insulating layer is positioned between the soft magnetic layer and the lower magnetic shield.

In one general embodiment, a method for forming a magnetic head includes forming a lower magnetic shield above a substrate; forming a sensor stack above the lower magnetic shield, wherein the sensor stack is adapted for sensing an external magnetic field; forming a rear insulating layer on a rear side of the sensor stack, the rear side being on an opposite side of the sensor stack as an air bearing surface (ABS) side of the sensor stack; forming a soft magnetic layer above the rear insulating layer near the rear side of the sensor stack; planarizing the soft magnetic layer; and forming an upper magnetic shield above the sensor stack and the soft magnetic layer; wherein the rear insulating layer is positioned between the soft magnetic layer and the sensor stack, and wherein the rear insulating layer is positioned between the soft magnetic layer and the lower magnetic shield.

Referring now to FIG. 1, there is shown a disk drive 150 in accordance with one embodiment of the present invention. As shown in FIG. 1, at least one rotatable magnetic disk 162 is supported on a spindle 164 and rotated by a drive mechanism, which may include a disk drive motor 168. The magnetic recording on each disk is typically in the form of an annular pattern of concentric data tracks (not shown) on the disk 162.

At least one slider 163 is positioned near the disk 162, each slider 163 supporting one or more magnetic read/write heads 171. As the disk rotates, slider 163 is moved radially in and out over disk surface 172 so that heads 171 may access different tracks of the disk where desired data are recorded and/or to be written. Each slider 163 is attached to an actuator arm 169 by means of a suspension 165. The suspension 165 provides a slight spring force which biases slider 163 against the disk surface 172. Each actuator arm 169 is attached to an actuator 177. The actuator 177 as shown in FIG. 1 may be a voice coil motor (VCM). The VCM comprises a coil movable within a fixed magnetic field, the direction and speed of the coil movements being controlled by the motor current signals supplied by controller 179.

During operation of the disk storage system, the rotation of disk 162 generates an air bearing between slider 163 and disk surface 172 which exerts an upward force or lift on the slider. The air bearing thus counter-balances the slight spring force of suspension 165 and supports slider 163 off and slightly above the disk surface by a small, substantially constant spacing during normal operation. Note that in some embodiments, the slider 163 may slide along the disk surface 172.

The various components of the disk storage system are controlled in operation by control signals generated by controller 179, such as access control signals and internal clock signals. Typically, control unit 179 comprises logic control circuits, storage (e.g., memory), and a microprocessor. The control unit 179 generates control signals to control various system operations such as drive motor control signals on line 173 and head position and seek control signals on line 178. The control signals on line 178 provide the desired current profiles to optimally move and position slider 163 to the desired data track on disk 162. Read and write signals are communicated to and from read/write heads 171 by way of recording channel 175.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an ABS of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

As described above, by arranging a soft magnetic layer at the rear face of the head on the opposite side to that of the ABS in a TMR head, read sensor output may be increased. Also, stability of the read head may be maintained by domain control of the soft magnetic layer. Thus, a magnetic head that combines this read head and a vertical write head, and a hard disk device in which this magnetic head is mounted, have excellent performance.

Figure 5A:
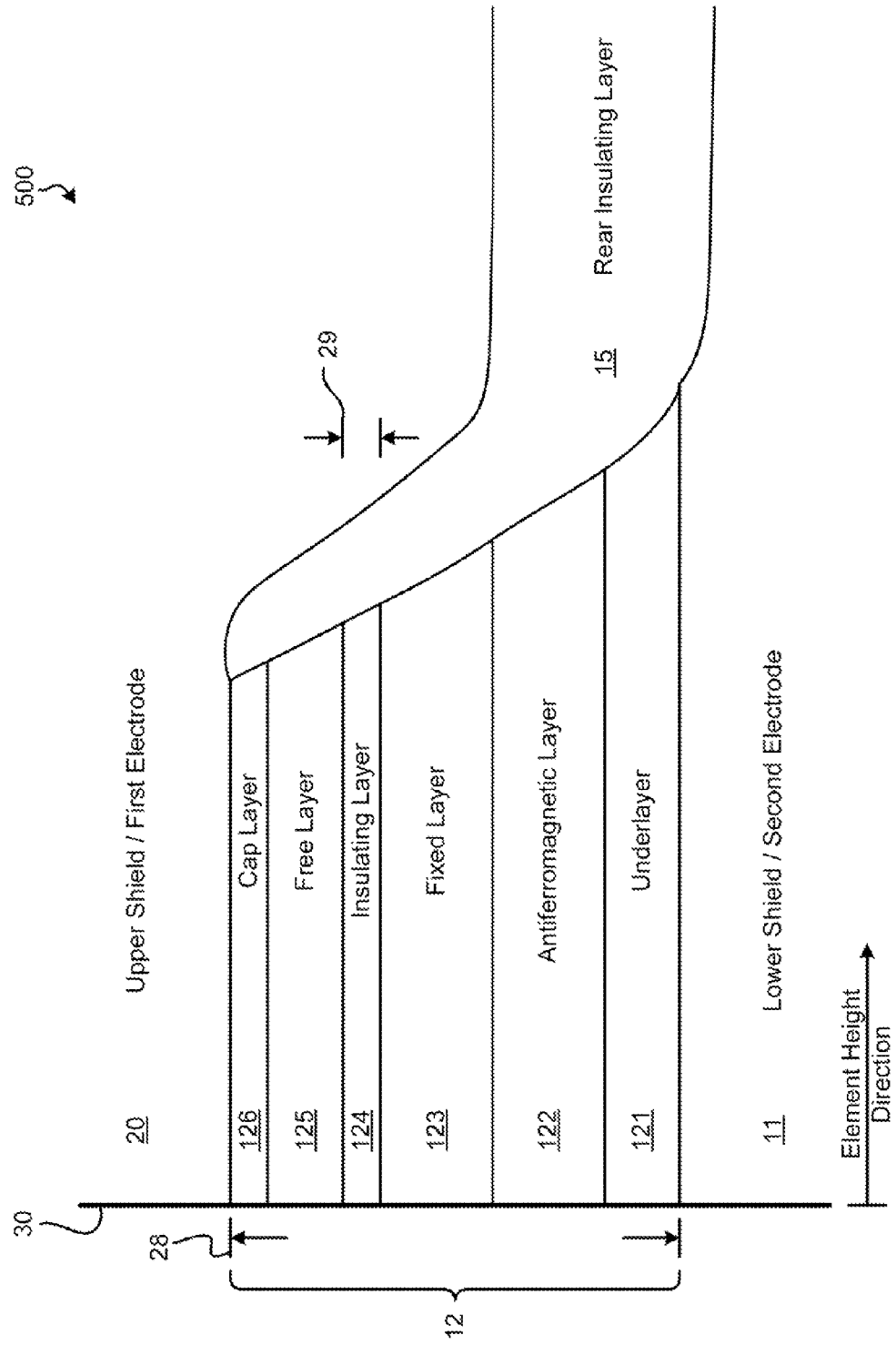
FIG. 5A shows a cross-sectional diagram of a read head in an element height direction, according to one embodiment.
Figure 5B:
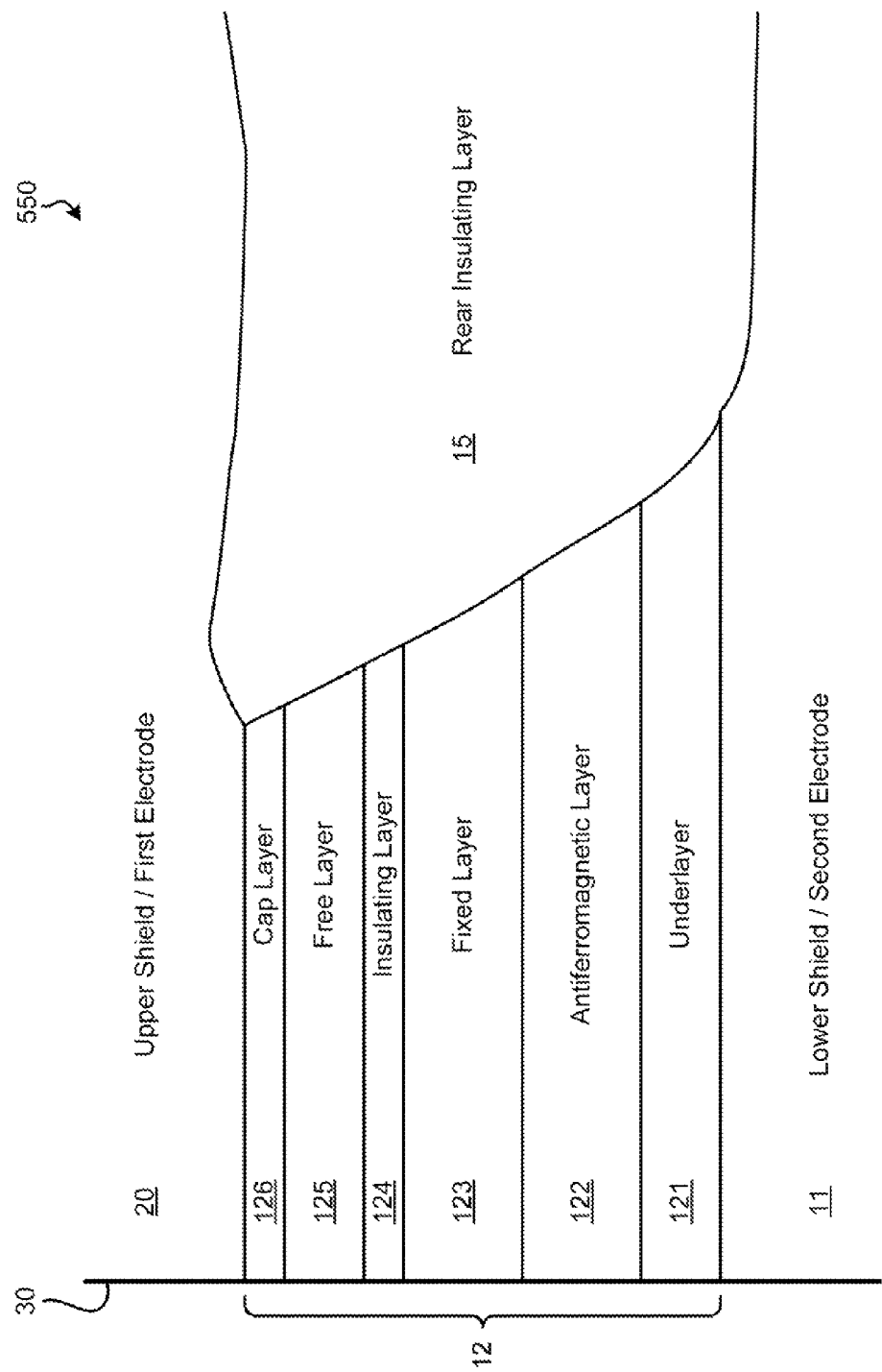
FIG. 5B shows a cross-sectional diagram of a read head in an element height direction, according to the prior art.
Figure 6:
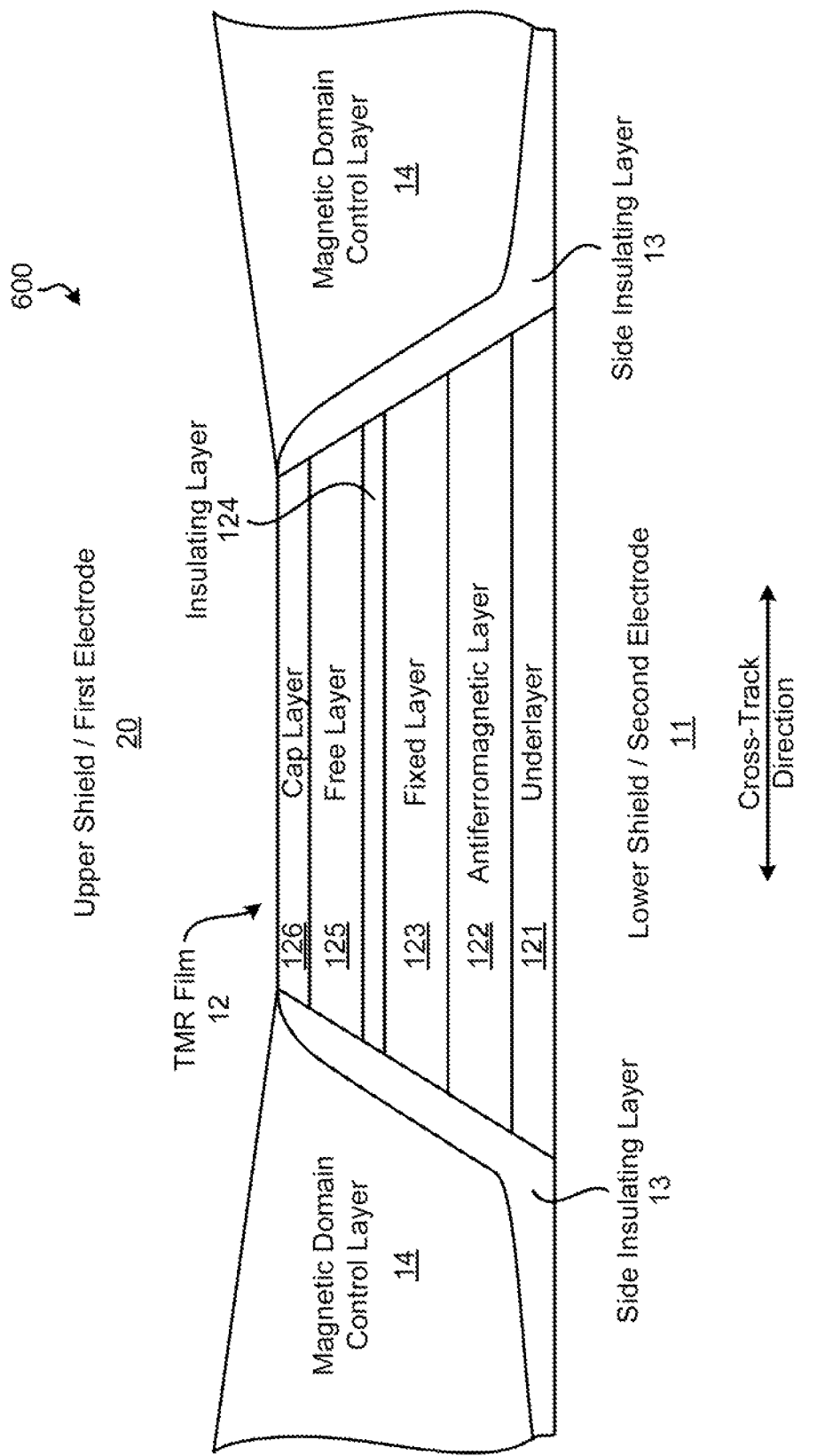
FIG. 6 is a diagram as seen from the air bearing surface in a read head according to one embodiment.

FIG. 5A shows a diagrammatic cross-sectional view in an element height direction of a head 500 according to one embodiment, while FIG. 5B shows a diagrammatic cross-sectional view in an element height direction of a conventional head 550. The element height direction is the depth direction from the head's ABS 30, e.g., the length direction of the head. Also, FIG. 6 shows a diagram of a read head 600 when viewed from the ABS. The conventional head 550 and the head 500 according to one embodiment have similar constructions when viewed from the ABS.

An outline of a method of producing a read head 500 is described below, according to one approach. Other methods may be used to produce the read head 500, according to various other embodiments. First, an NiFe layer having a thickness of about 1.5 μm is formed by pattern plating as a lower shield 11, which also serves as an electrode, on a precision-ground non-magnetic substrate, with an insulating layer, such as alumina or MgO, formed thereon as a thin layer. The upper surface of the lower shield 11 is leveled using chemical-mechanical polishing (CMP) or some other suitable method known in the art.

Next, since the lower shield 11 surface is oxidized, the oxide layer is removed by ion milling or some other suitable method known in the art, and a TMR film 12 is formed thereon. The TMR film 12 may be formed by consecutively forming: an underlayer layer 121 comprising Ta (2 nm)/Ru (2 nm), or other suitable material(s) in appropriate thickness(es) as known in the art, in order to control the crystallinity of the film; an AFM layer 122 comprising MnIr (6 nm) or other suitable material(s) such as MnPt or MnRu in appropriate thickness(es) as known in the art; a magnetization fixing layer 123 comprising a laminated ferrimagnetic structure of CoFe (2 nm)/Ru (0.8 nm)/CoFe (1 nm)/CoFeB (1 nm)/CoFe (0.5 nm) or other suitable material(s) in appropriate thickness(es) as known in the art; a non-magnetic insulating layer 124, also referred to in the art as a tunnel barrier layer, comprising MgO (1 nm) or other suitable material(s) in appropriate thickness(es) as known in the art; a magnetization free layer 125 comprising CoFe (1 nm)/NiFe (3 nm) or other suitable material(s) in appropriate thickness(es) as known in the art; and a cap layer 126 comprising Ru (3 nm)/Ta (3 nm) or other suitable material(s) in appropriate thickness(es) as known in the art.

After this, patterning is performed using a photolithography/ion milling technique or other suitable method(s) known in the art, and a magnetic domain control layer 14 is formed above a side insulating layer 13 (alumina having a thickness of about 4 nm) to ensure that the magnetization free layer 125 operates in stable fashion, and for maintaining insulation of the upper shield 20 and the lower shield 11, at both ends of the TMR film 12. A high-coercivity layer may be formed of CoPt, CoCrPt, and/or FePt. The magnetic domain control layer 14 is formed on both sides of the TMR film 12 in a cross-track direction, disposed adjacent the side insulating layer 13.

Next, a rear insulating layer 15 (which may comprise alumina or other suitable material known in the art) is formed in order to maintain insulation of the upper shield 20 and the lower shield 11, at the rear end of the TMR film 12, as seen from the ABS of the TMR film 12.

One difference between head 500 according to one embodiment, and the conventional head 550 lies in the thickness of the rear insulating layer 15: in head 500, the thickness of the rear insulating layer may be from about 10 nm to about 20 nm, such as about 14 nm in one approach (thickness of the leveled region on the wafer), while the thickness of the rear insulating layer 15 of the conventional head 550 is anywhere from 30 nm to 40 nm, such as 34 nm (thickness of the leveled region on the wafer).

To complete the head, the upper shield 14 is formed, such as via plating or other suitable method known in the art to a thickness of about 1.0 μm, using any suitable material known in the art, such as NiFe. The sputtered NiFe may comprise a plated electrode. As seen in FIG. 5A, if the rear insulating layer 15 is thin, part of the upper shield is formed at the rear section of the TMR film 12. The upper shield 20 may be formed using a NiFe layer and the soft magnetic layer (not shown) is formed at the rear section of the TMR film 12.

Figure 7:
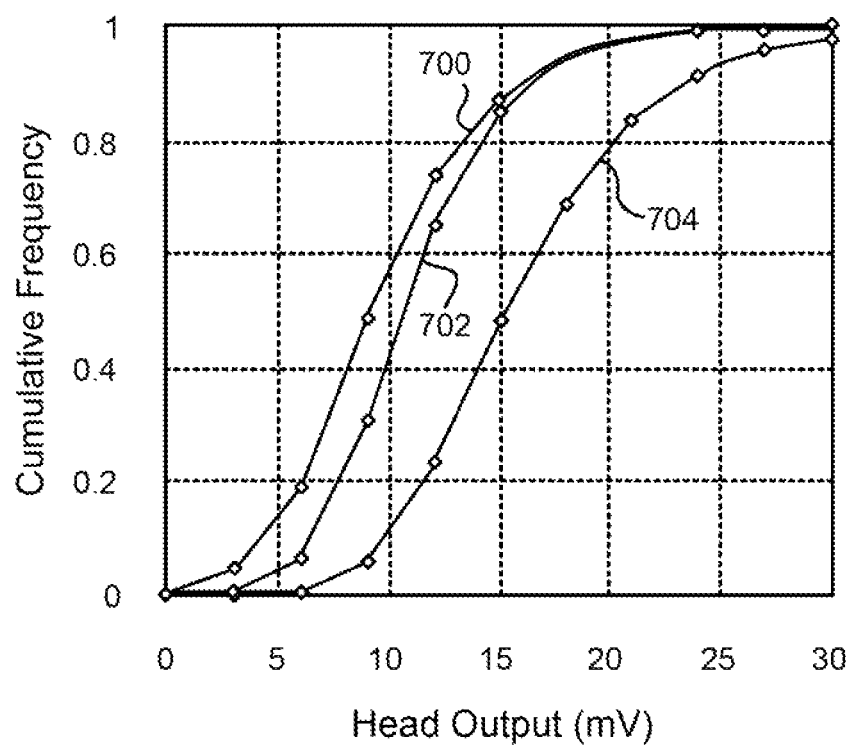
FIG. 7 shows a cumulative distribution curve of the head output with respect to a rear insulating film thickness in a read head according to various embodiments.

FIG. 7 shows a cumulative distribution curve of read head output when the thickness of the rear insulating layer is varied. In this case, the head output is taken as the output when an external magnetic field of ±500 Oe is applied to the slider: the vertical axis shows the value obtained when the cumulative number of heads is divided by the total number of heads. Also, the thickness of the rear insulating layer is specified as the thickness of the leveled region on the wafer. Line 700 represents the output of a head having a rear insulting film with a thickness of 34 nm, line 702 represents the output of a head having a rear insulting film with a thickness of 24 nm, and line 704 represents the output of a head having a rear insulting film with a thickness of 14 nm. It can be seen that, as shown in FIG. 7, as the rear insulating layer becomes thinner, the head output distribution shifts towards the higher output side, e.g., the head output is higher.

However, the device output abruptly increases when the rear insulating layer thickness is below about 24 nm. This is because the benefit of the rear insulating layer differs depending on the device used to form the rear insulating layer along with the formation conditions, so the thickness of the rear insulating layer at which increased output is obtained is different depending on these factors. Accordingly, the thickness of the rear insulating layer should be determined based on the other components and materials used in the head.

Referring again to FIGS. 5A-5B, owing to the formation of the lower end of the upper shield/electrode layer 20 below the height 28 of the TMR film 12 in head 500, the slider output starts to increase. In addition, the benefit of forming the upper shield/electrode layer 20 below the height 29 (which is the bottom face height of the magnetization free layer 125) of the non-magnetic insulating layer 124 becomes considerable.

Figure 8A:
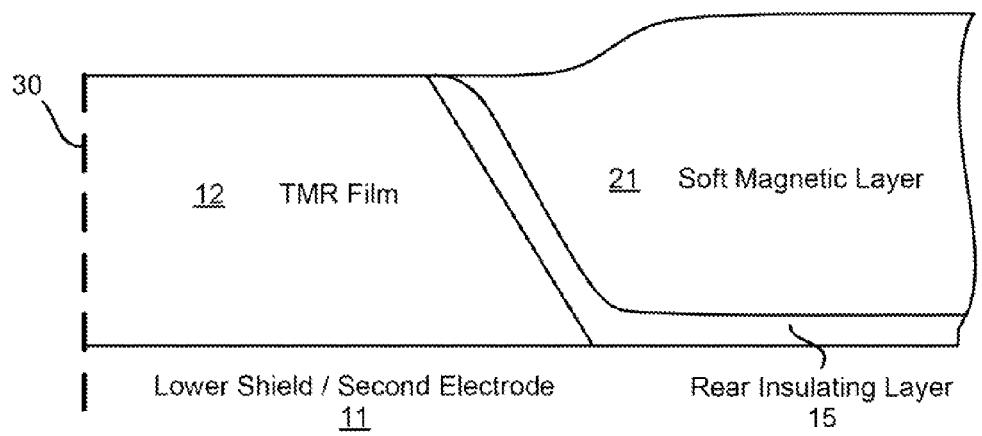
FIGS. 8A-8C show examples of manufacturing method for a read head according to one embodiment.
Figure 8B:
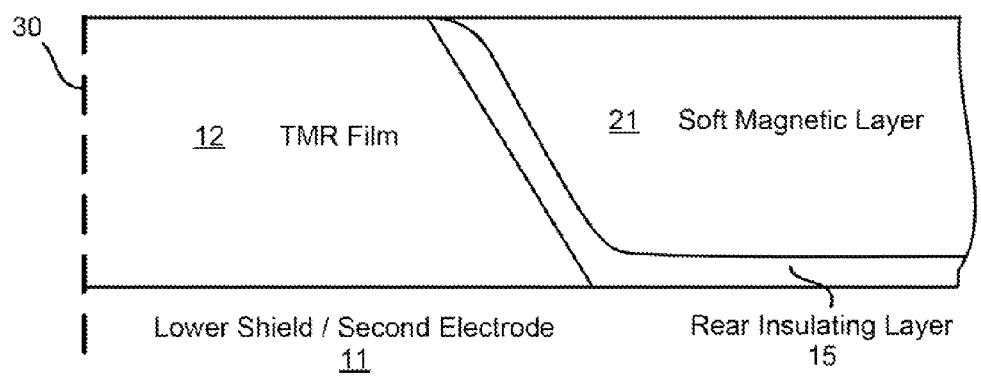
Figure 8C:
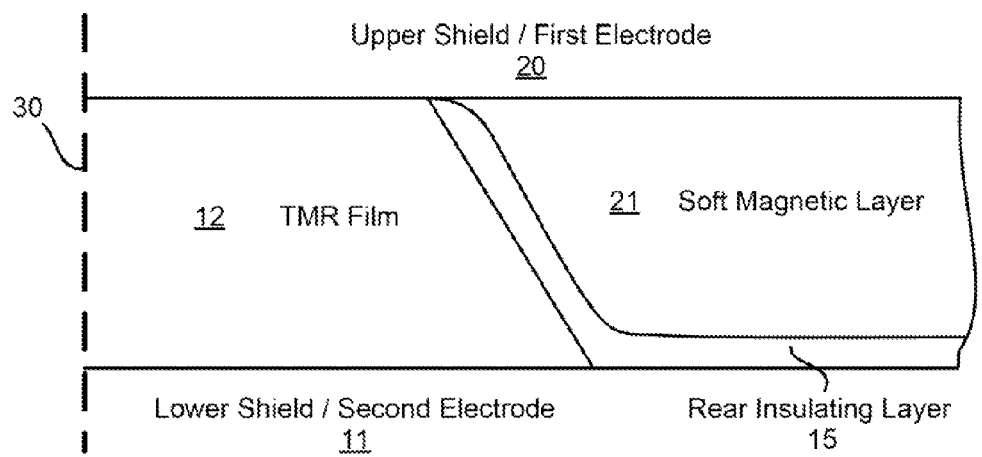

The rear insulating layer 15 is therefore formed as thin as possible while still preventing short-circuiting of the upper shield 20 and the lower shield 11. As shown in FIGS. 8A-8C, a method which may be employed to form a magnetic head. The method comprises consecutively forming the lower shield 11, the TMR film 12, the rear insulating layer 15, and a thick soft magnetic layer 21 comprising NiFe or the like, as shown in FIG. 8A. Then, as shown in FIG. 8B, leveling is performed using CMP or some other suitable method known in the art to level the soft magnetic layer 21. Then, as shown in FIG. 8C, the upper shield 20 is formed using any method known in the art. The rear soft magnetic layer 21 and the upper shield 20 are formed directly adjacent one another in one embodiment, and these two magnetic layers are magnetically coupled. However, the benefit of improved slider output is found even when a non-magnetic layer is formed above the soft magnetic layer 21 to separate the upper shield 20 form the soft magnetic layer 21.

Figure 9:
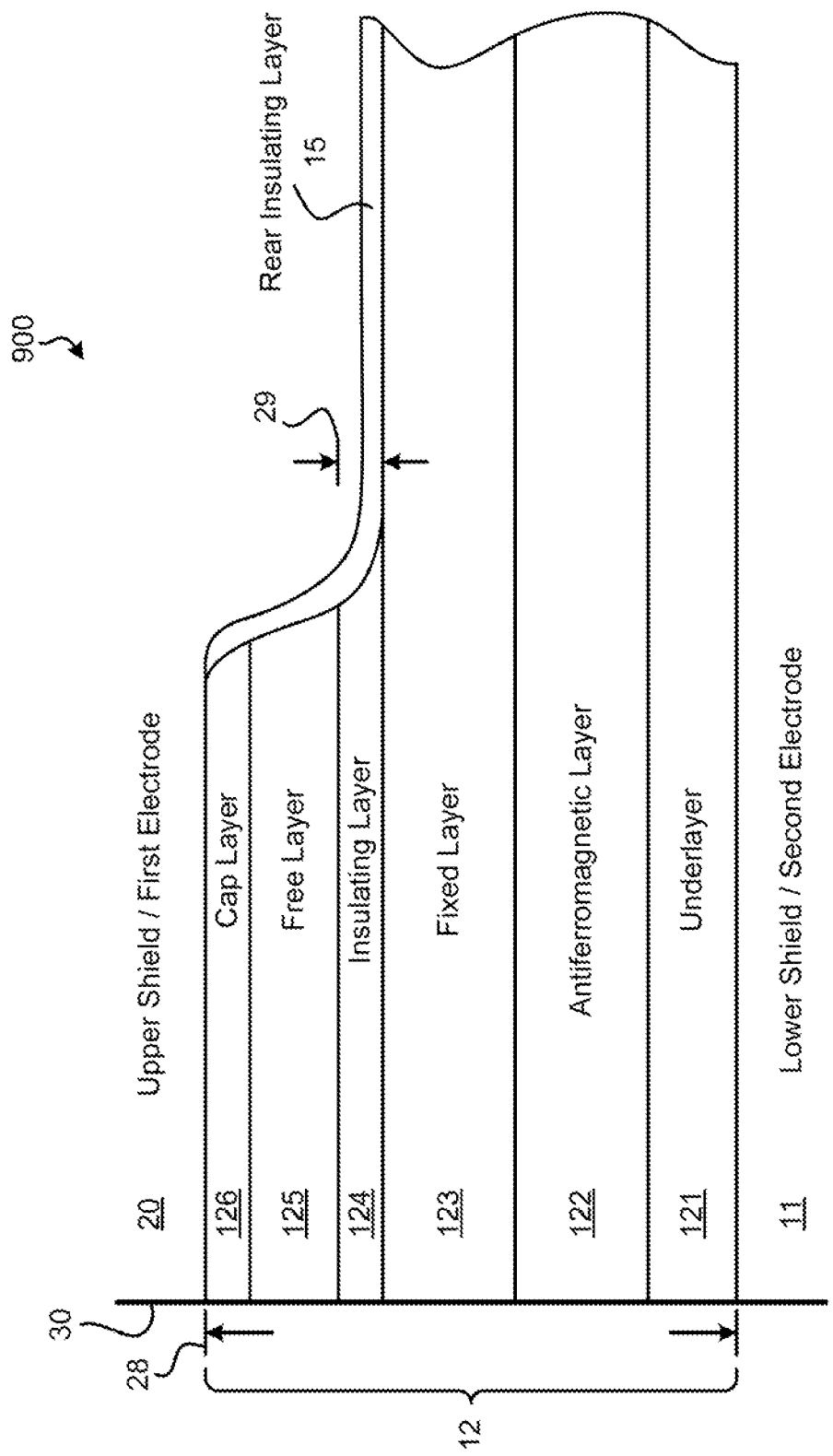
FIG. 9 shows a cross-sectional diagram of a read head in an element height direction, according to one embodiment.

In this embodiment, as shown in FIG. 8C, the rear section of the TMR film 12 may be formed with a rear insulating layer 15 by removal thereof using ion milling as far as the lower shield 11; however, as shown in FIG. 9, it does not matter if some of the AFM layer 122 or fixed layer 123 is not removed, the benefits are still present in this read head 900. The benefit is also obtained if the upper shield 20 is formed as far as anywhere near the height 29 of the non-magnetic insulating layer 124.

Even though in this embodiment, a TMR film 12 was formed as the sensor, benefits of this structure are obtained even if another magnetic resistance effect sensor, such as a giant magnetoresistance (GMR) film sensor, anisotropic magnetoresistance (AMR) film sensor, etc., is substituted in place of the TMR sensor. Also, in this embodiment, a high-coercivity material was employed as the magnetic domain control layer 14, but any soft magnetic material, such as NiFe or the like, may be formed in place of the high-coercivity material and still achieve the benefits.

Figure 10A:
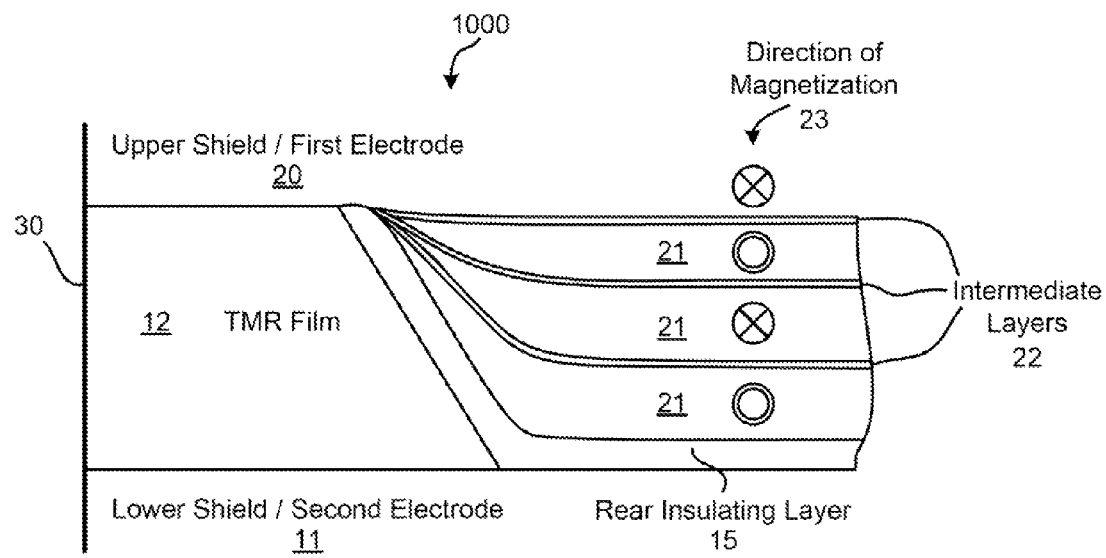
FIGS. 10A-10B show cross-sectional diagrams of read head structures according to several embodiments.

As another embodiment, in order to improve stability of the head, a read head 1000 constructed as in FIG. 10A was manufactured and tested. The method of manufacture is roughly the same as in the case of previous embodiments. First, a lower shield 11 is formed on a precision-ground non-magnetic substrate formed with a thin layer of an insulating layer, such as alumina, and patterning of the TMR film 12, formation of the side insulating layer 13 on both flanks, and formation of the magnetic domain control layer 14 are carried out. This magnetic head 1000 is characterized in that a plurality of soft magnetic layers 21 are mutually antiferromagnetically coupled by alternate lamination of soft magnetic layers 21 and non-magnetic intermediate layers 22 (e.g., of Ru, Ir, and Cr) that act as antiparallel coupling (APC) layers, after formation of the rear insulating layer 15. In this case, NiFe (7 nm) and Ru (0.8 nm) were laminated as the soft magnetic layers 21 and the non-magnetic intermediate layers 22. In this way, generation of magnetic domains in the soft magnetic layer 21 at the back face becomes difficult, the magnetization free layer 125 in the TMR film 12 is stabilized, and the head yield is improved. Although in this case Ru was employed for the non-magnetic layers 22 that were laminated with the soft magnetic layers 21, the same beneficial effect is obtained by using other suitable materials, such as Ir, Cr, etc.

Figure 10B:
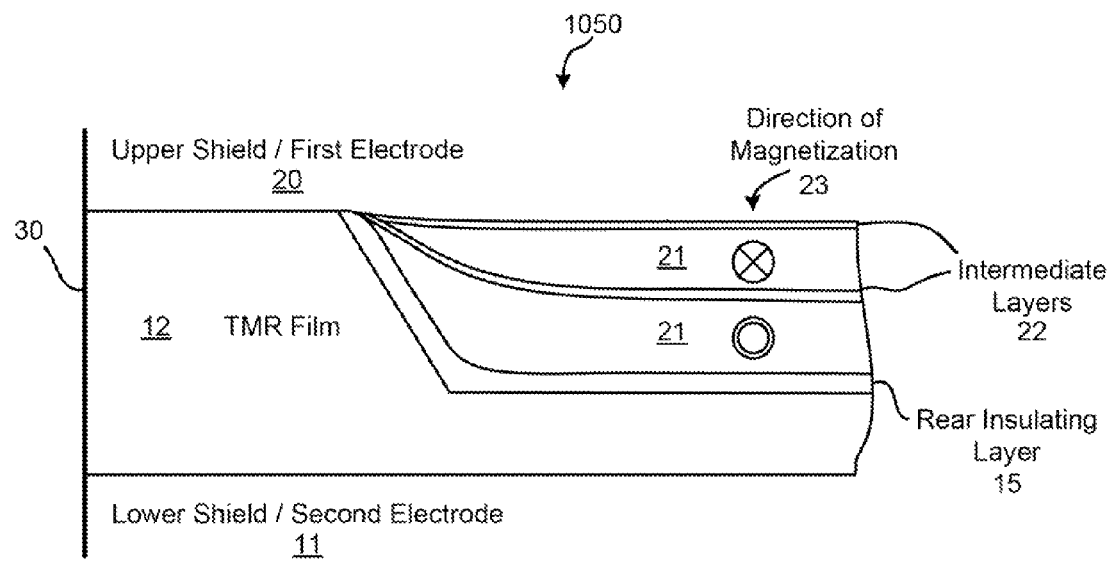

In this embodiment, as shown in FIG. 10A, the rear section of the TMR film 12 was formed with a rear insulating layer 15 by removal thereof by ion milling as far as the lower shield 11; however, as shown in FIG. 10B, a read head 1050 may be formed where a portion of the TMR film 12 above the lower shield 11 remains. Fully sufficient benefit is obtained if the film obtained by alternate lamination of the soft magnetic layers 21 and non-magnetic intermediate layers 22 is formed as far as the vicinity of the height 29 of the non-magnetic insulating layer 124 of the TMR film 12.

In another embodiment, as shown in FIG. 1A, a read head 1100 was manufactured adopting, at the rear section of the TMR film 12, a multi-layer construction of a bias layer 23 comprising an AFM layer or layer of high coercivity and soft magnetic layer 21. In this case, MnIr (7 nm) was formed as the bias layer 23 and Co (0.5 nm)/NiFe (20 nm) was formed as the soft magnetic layer 21. However, any other materials and thicknesses known in the art may be used. The reason for forming Co between the MnIr layers and the NiFe layers is that this increases the exchange coupling of the MnIr and the soft magnetic layers 21. As a result, by stabilizing the magnetization of the soft magnetic layers 21, the magnetization free layer 125 in the TMR film 12 is stabilized and the head yield is increased.

Figure 11A:
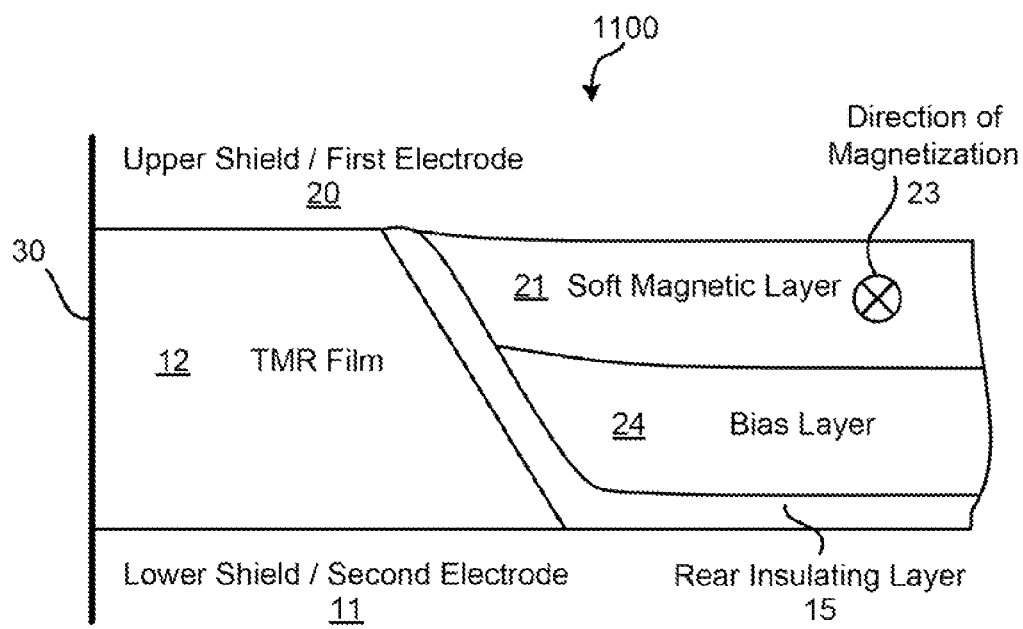
FIGS. 11A-11B show cross-sectional diagrams of read head structures according to several embodiments.
Figure 11B:
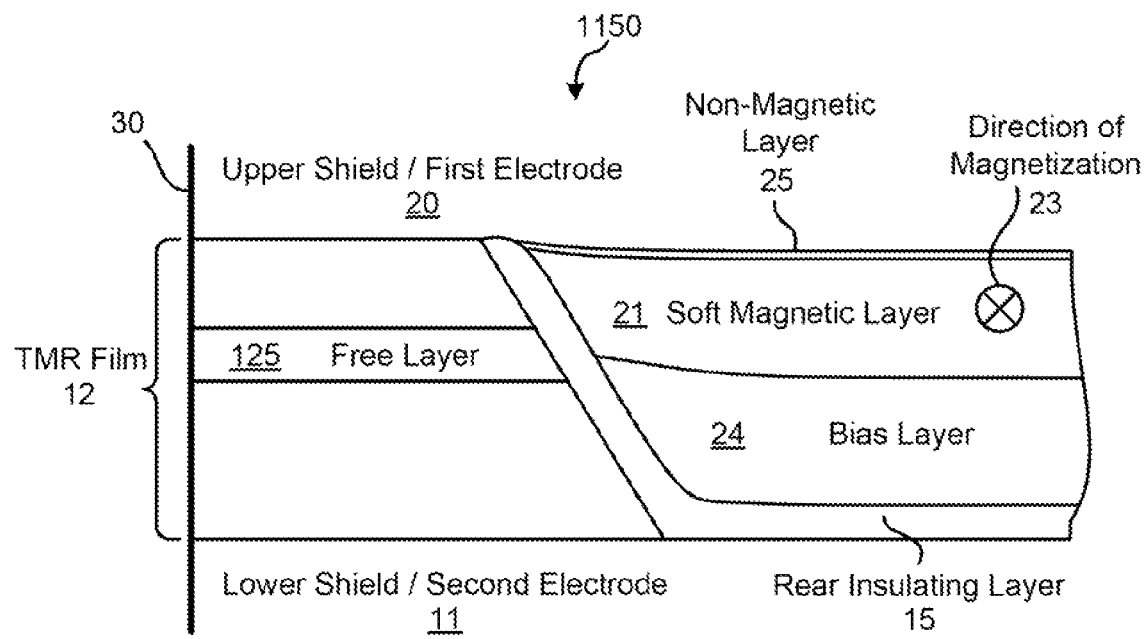

In FIG. 11A, the soft magnetic layer 21 and the upper shield 20 are in direct contact and magnetically coupled, but, as shown in FIG. 11B, a read head 1150 may be formed with a non-magnetic layer 25 between the soft magnetic layer 21 and the upper shield 20. In this way, the soft magnetic layers 21 may be controlled in isolation from the upper shield magnetic characteristics, so the magnetization free layer 125 in the TMR film 12 is further stabilized, increasing the head yield. In this embodiment, the bias layer 24 was positioned below the soft magnetic layer 21, but it does not matter if the bias layer 24 is formed above the soft magnetic layers 21, so long as the soft magnetic layer 21 is formed so as to be positioned at the rear section of the free layer 125 of the TMR film 12. Likewise, the rear section of the TMR film 12 was removed by ion milling, but the same beneficial effect is obtained even if some of the TMR film 12 is left at the rear section of the TMR, so long as the soft magnetic layer 21 is formed so as to be positioned at the rear section of the free layer 125 of the TMR film 12.

Figure 12A:
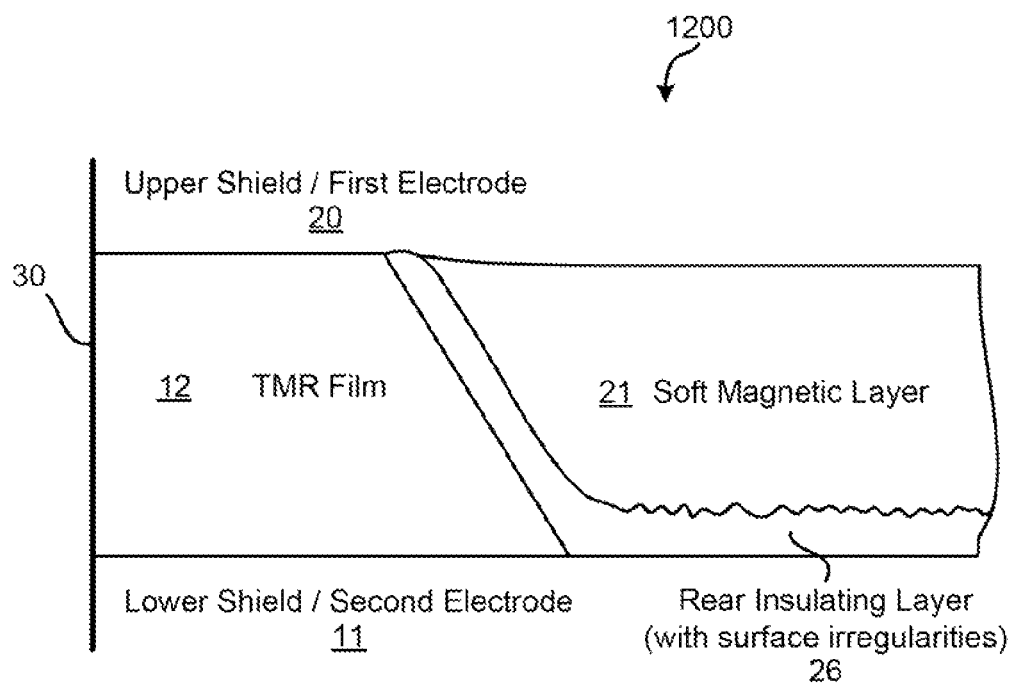
FIGS. 12A-12B show cross-sectional diagrams of read head structures according to several embodiments.

Also, as another embodiment, as shown in FIG. 12A, a read head 1200 was manufactured in which, when forming the rear insulating layer 26 at the back of the TMR film 12, after initial formation of the rear insulating layer, a rear insulating layer 26 was formed with unidirectional grooves (in the track width direction in the drawings) using ion milling, and a soft magnetic layer 21 was formed thereon. First, an alumina rear insulating layer having a thickness of about 30 nm is formed and the wafer rotation is then stopped. 15 nm of alumina is then removed after putting the ion beam angle into a condition inclined at 60° from the layer perpendicular direction, so that Ar ions arrive from a single direction. In this way, grooves are formed unidirectionally on the alumina rear insulating layer 26. A layer of NiFe 21 having a thickness of about 28 nm may then be formed thereon. In this way, stabilization is achieved by arranging for the anisotropy of the NiFe soft magnetic layer 21 to be directed in the track width direction. As a result, the magnetization free layer in the TMR film 12 is also further stabilized and the head yield is improved. Although in FIG. 12A, the rear section of the TMR film 12 was removed, even if some of the TMR film 12 is left at the rear section of the TMR, the same beneficial effect is obtained so long as a soft magnetic layer 21 is positioned at the rear section of the free layer of the TMR film 12.

Figure 12B:
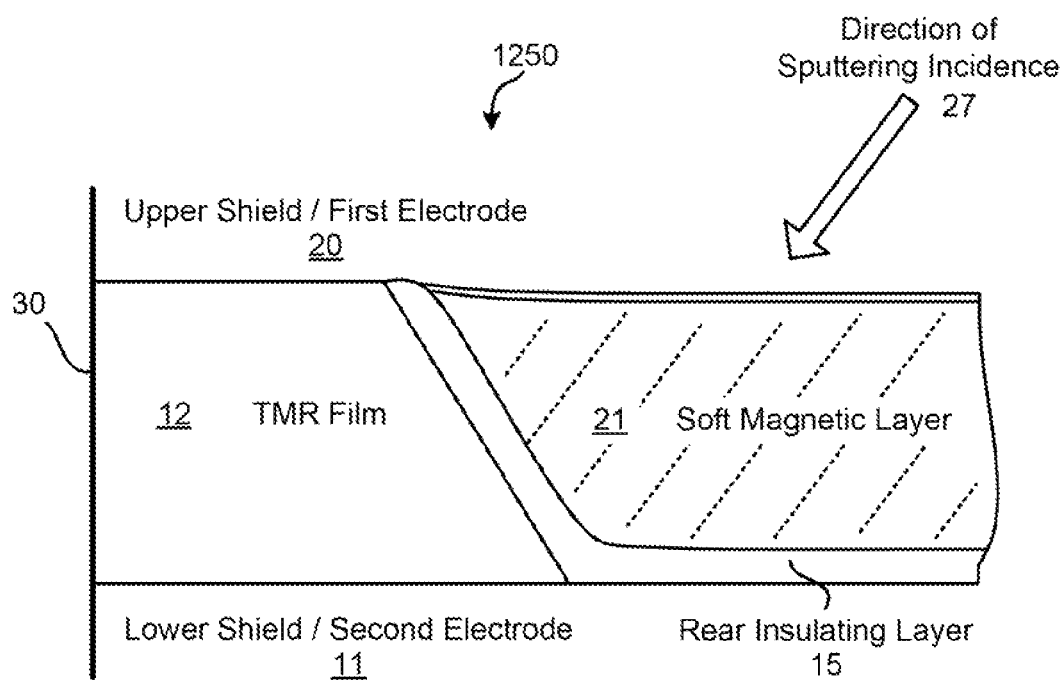

In another embodiment, as shown in FIG. 12B, a read head 1250 was manufactured wherein, after forming the rear insulating layer 15 at the back of the TMR film 12, a soft magnetic layer 21 was formed, with the sputtered particle incidence direction 27 being unidirectional. As a result, the anisotropy of the soft magnetic layer 21 was increased and the same beneficial effect as in the case of the preceding embodiments was obtained. In this embodiment, when sputter-forming the NiFe, the direction of sputtering incidence 27 was arranged to be from the rear direction of the TMR film 12, with this direction of sputtering incidence being from about 60° to about 80°, such as about 70°, from the film surface perpendicular direction and the film was formed with a thickness of about 30 nm.

Under ordinary conditions, the crystal grains normally grow in the direction perpendicular to the film surface, but, by arranging for the direction of incidence 27 to be inclined so that the crystal grains are formed unidirectionally, the crystal grains grow in inclined fashion in the direction of sputtering incidence and anisotropy is increased by this effect. As a result, the stability of the soft magnetic layer 21 is increased, thereby stabilizing the magnetization free layer in the TMR film 12 and improving head yield. In FIG. 12B, the rear section of the TMR film 12 was removed, but the same beneficial effect is obtained even if some of the TMR film 12 is left behind at the rear section of the TMR, so long as the soft magnetic layer 21 is formed so as to be arranged at the rear section of the free layer of the TMR film 12.

Figure 13A:
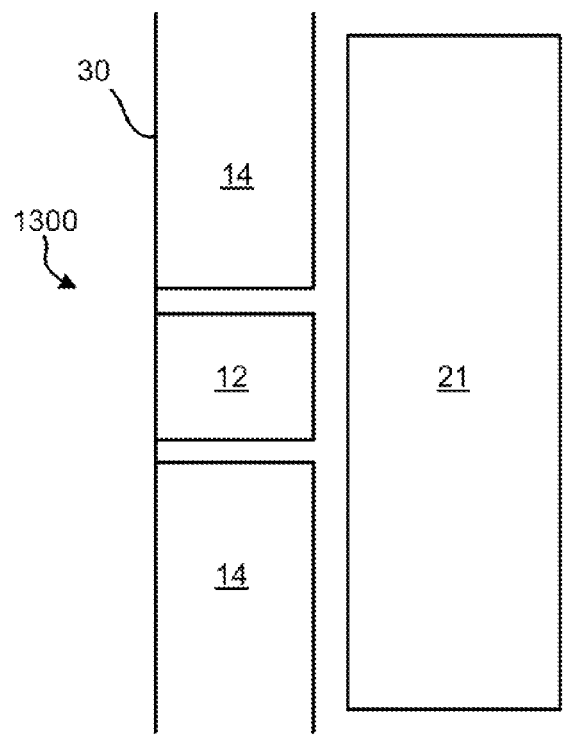
FIGS. 13A-13B show top views of read head structures according to several embodiments.
Figure 13B:
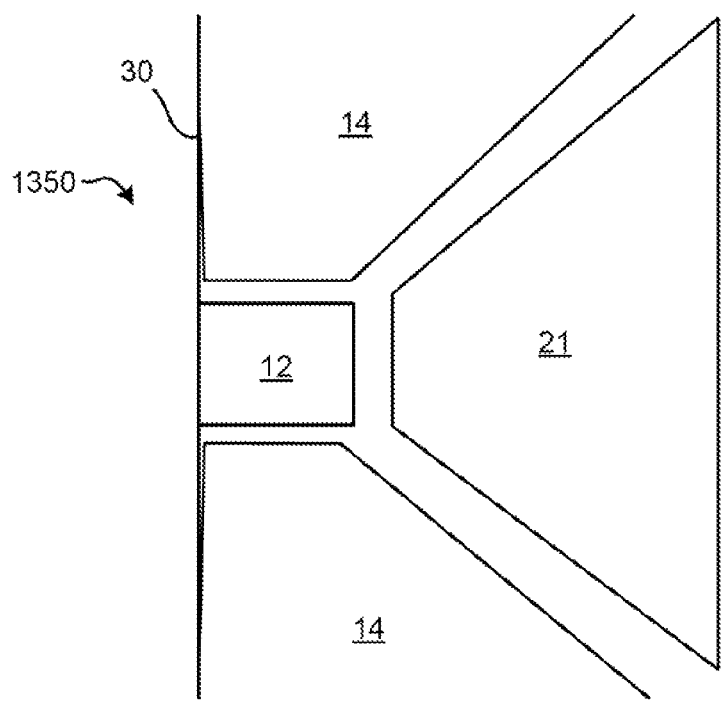

Next, in FIGS. 13A-13B, a surface at the same height as the free layer of the TMR film 12 is shown from the top in the lamination direction. As shown in FIG. 13A, a structure 1300 may be used in which the soft magnetic layer 21, that is positioned in the rear section of the TMR film 12, is long in the lateral direction. In FIG. 13B, the structure 1350 includes a soft magnetic layer 21, that is positioned in the rear section of the TMR film 12, that is progressively longer in the lateral direction with increased depth. In either structure, the magnetic domain structure of the soft magnetic layer 21 is stabilized, which is desirable.

By applying these read heads in magnetic devices, both higher output and high stability may be achieved. A magnetic head and a hard disk device combining such a read head and perpendicular head show excellent performance.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a read sensor configured to sense an external magnetic field;
   an upper magnetic shield positioned above the read sensor along a media-facing surface of the read sensor;
   a lower magnetic shield positioned below the read sensor along the media-facing surface of the read sensor;
   a rear insulating layer positioned on a rear side of the read sensor, the rear side being on an opposite side of the read sensor as the media-facing surface of the read sensor; and
   a soft magnetic layer positioned near the rear side of the read sensor opposite the media-facing surface of the read sensor,
   wherein the rear insulating layer is positioned between the soft magnetic layer and the read sensor,
   wherein the rear insulating layer is positioned between the soft magnetic layer and the lower magnetic shield, and
   wherein crystal grains of the soft magnetic layer are inclined from a surface of the soft magnetic layer that is perpendicular to the media-facing surface of the read sensor.

2. The magnetic head as recited in claim 1, wherein the upper magnetic shield and the lower magnetic shield serve as electrodes for the read sensor when the magnetic head is in use.

3. The magnetic head as recited in claim 1, wherein the soft magnetic layer comprises material different from a material used for the upper magnetic shield, and wherein the soft magnetic layer comprises material different from a material used for the lower shield.

4. The magnetic head as recited in claim 1, wherein a magnetic anisotropy of the soft magnetic layer exhibits characteristics of being magnetic domain-controlled, and wherein the crystal grains of the soft magnetic layer are inclined at an angle of greater than 0° and less than 90° with respect to the surface of the soft magnetic layer that is perpendicular to the media-facing surface of the read sensor.

5. The magnetic head as recited in claim 1, wherein the soft magnetic layer comprises a laminated structure with an exchange bias layer positioned below a soft magnetic layer.

6. The magnetic head as recited in claim 5, wherein the exchange bias layer comprises either an antiferromagnetic material comprising at least one of MnIr, MnPt, and MnRu, or a high-coercivity material comprising at least one of CoPt, CoCrPt, and FePt.

7. The magnetic head as recited in claim 1, further comprising magnetic domain control layers positioned on both sides of the read sensor in a cross-track direction, wherein side insulating layers are disposed between the magnetic domain control layers and the read sensor, and wherein the side insulating layers are disposed between the magnetic domain control layers and the lower magnetic shield.

8. A magnetic data storage system, comprising:
   at least one magnetic head as recited in claim 1;
   a magnetic medium;
   a drive mechanism for passing the magnetic medium over the at least one magnetic head; and
   a controller electrically coupled to the at least one magnetic head for controlling operation of the at least one magnetic head.

9. A method for forming a magnetic head as recited in claim 1, the method comprising:
   forming the lower magnetic shield above a substrate;
   forming a sensor stack above the lower magnetic shield, wherein the sensor stack is configured to act as the read sensor;
   forming the rear insulating layer on the rear side of the sensor stack, the rear side being on the opposite side of the sensor stack as the media-facing surface side of the sensor stack;
   forming the soft magnetic layer above the rear insulating layer near the rear side of the sensor stack;
   planarizing the soft magnetic layer; and forming the upper magnetic shield above the sensor stack and the soft magnetic layer;

wherein the rear insulating layer is positioned between the soft magnetic layer and the sensor stack, and wherein the rear insulating layer is positioned between the soft magnetic layer and the lower magnetic shield.

10. The method as recited in claim 9, wherein the soft magnetic layer comprises material different from a material used for the upper magnetic shield, and wherein the soft magnetic layer comprises material different from a material used for the lower shield.

11. The method as recited in claim 9, wherein a magnetic anisotropy of the soft magnetic layer exhibits characteristics of being magnetic domain-controlled.

12. The method as recited in claim 9, wherein the soft magnetic layer comprises alternately laminated layers of a non-magnetic material and a soft magnetic material, wherein the non-magnetic material comprises at least one of Ru, Ir, and Cr.

13. The method as recited in claim 9, wherein the forming the soft magnetic layer comprises forming an exchange bias layer below a soft magnetic layer, wherein the exchange bias layer comprises either an antiferromagnetic material comprising at least one of MnIr, MnPt, and MnRu, or a high-coercivity material comprising at least one of CoPt, CoCrPt, and FePt.

14. The method as recited in claim 9, wherein the rear insulating film has a surface adjacent the soft magnetic layer which comprises unidirectional grooves.

15. The method as recited in claim 9, wherein the forming the soft magnetic layer comprises sputtering a soft magnetic material in a direction of sputtering incidence which is inclined from a surface of the soft magnetic layer that is perpendicular to the media-facing surface of the sensor stack such that crystal grains of the soft magnetic layer are inclined from a surface of the soft magnetic layer that is perpendicular to the media-facing surface of the sensor stack, and wherein the crystal grains of the soft magnetic layer are inclined at an angle of greater than 0° and less than 90° with respect to the surface of the soft magnetic layer that is perpendicular to the media-facing surface of the sensor stack.

16. A magnetic head, comprising:
a read sensor configured to sense an external magnetic field;
an upper magnetic shield positioned above the read sensor along a media-facing surface of the read sensor;
a lower magnetic shield positioned below the read sensor along the media-facing surface of the read sensor;
a rear insulating layer positioned on a rear side of the read sensor, the rear side being on an opposite side of the read sensor as the media-facing surface of the read sensor; and
a soft magnetic layer positioned near the rear side of the read sensor opposite the media-facing surface of the read sensor,
wherein the rear insulating layer is positioned between the soft magnetic layer and the read sensor,
wherein the rear insulating layer is positioned between the soft magnetic layer and the lower magnetic shield, and
wherein the soft magnetic layer comprises alternately laminated layers of a non-magnetic material and a soft magnetic material.

17. The magnetic head as recited in claim 16, wherein the non-magnetic material comprises at least one of: Ru, Ir, and Cr.

18. The magnetic head as recited in claim 16, wherein a lower portion of the read sensor extends below the soft magnetic layer, the lower portion being below an upper surface height of a fixed layer of the read sensor.

19. A magnetic head, comprising:
a read sensor configured to sense an external magnetic field;
an upper magnetic shield positioned above the read sensor along a media-facing surface of the read sensor;
a lower magnetic shield positioned below the read sensor along the media-facing surface of the read sensor;
a rear insulating layer positioned on a rear side of the read sensor, the rear side being on an opposite side of the read sensor as the media-facing surface of the read sensor; and
a soft magnetic layer positioned near the rear side of the read sensor opposite the media-facing surface of the read sensor,
wherein the rear insulating layer is positioned between the soft magnetic layer and the read sensor,
wherein the rear insulating layer is positioned between the soft magnetic layer and the lower magnetic shield, and
wherein the rear insulating layer has a surface adjacent the soft magnetic layer which comprises unidirectional grooves.

20. A magnetic head, comprising:
a read sensor configured to sense an external magnetic field;
an upper magnetic shield positioned above the read sensor along a media-facing surface of the read sensor;
a lower magnetic shield positioned below the read sensor along the media-facing surface of the read sensor;
a rear insulating layer positioned on a rear side of the read sensor, the rear side being on an opposite side of the read sensor as the media-facing surface of the read sensor; and
a soft magnetic layer positioned near the rear side of the read sensor opposite the media-facing surface of the read sensor,
wherein the rear insulating layer is positioned between the soft magnetic layer and the read sensor,
wherein the rear insulating layer is positioned between the soft magnetic layer and the lower magnetic shield, and
wherein a lower portion of the read sensor extends below the soft magnetic layer, the lower portion being below an upper surface height of a fixed layer of the read sensor.

* * * * *

UNITED STATES PATENT AND TRADEMARK OFFICE
CERTIFICATE OF CORRECTION

| | | Page 1 of 1 |
|---|---|---|
| PATENT NO. | : 8,873,203 B2 | |
| APPLICATION NO. | : 13/724529 | |
| DATED | : October 28, 2014 | |
| INVENTOR(S) | : Hoshino et al. | |

It is certified that error appears in the above-identified patent and that said Letters Patent is hereby corrected as shown below:

In the specification:

col. 10, line 15 replace "1A," with --11A,--.

Signed and Sealed this
Nineteenth Day of May, 2015

Michelle K. Lee
*Director of the United States Patent and Trademark Office*